(12) United States Patent
Welty et al.

(10) Patent No.: US 10,875,588 B2
(45) Date of Patent: Dec. 29, 2020

(54) ACTIVE DECK-LID SPOILER CONTROL SYSTEM FOR A MOTOR VEHICLE

(71) Applicant: GM Global Technology Operations LLC, Detroit, MI (US)

(72) Inventors: Mark A. Welty, Sterling Heights, MI (US); Danilo A. Oliveira, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 16/248,101

(22) Filed: Jan. 15, 2019

(65) Prior Publication Data

US 2020/0223498 A1 Jul. 16, 2020

(51) Int. Cl.
*B62D 35/00* (2006.01)
*B62D 37/02* (2006.01)

(52) U.S. Cl.
CPC ........... *B62D 35/007* (2013.01); *B62D 35/00* (2013.01); *B62D 37/02* (2013.01)

(58) Field of Classification Search
CPC ....... B62D 35/007; B62D 37/02; B62D 35/00
USPC .......................................... 296/180.1, 180.5
See application file for complete search history.

(56) References Cited

U.S. PATENT DOCUMENTS

| 4,810,022 | A | * | 3/1989 | Takagi | B62D 35/005 296/180.5 |
| 5,165,751 | A | * | 11/1992 | Matsumoto | B62D 35/007 296/180.5 |
| 6,431,639 | B2 | * | 8/2002 | Yoon | B62D 35/007 296/180.1 |
| 7,708,335 | B2 | * | 5/2010 | Wegener | B60T 1/16 296/180.1 |
| 10,035,548 | B2 | | 7/2018 | Barber | |
| 2016/0159412 | A1 | | 6/2016 | Oxley et al. | |
| 2016/0304139 | A1 | | 10/2016 | Handzel, Jr. | |

* cited by examiner

*Primary Examiner* — Joseph D. Pape

(57) ABSTRACT

A vehicle having a vehicle sensor configured to detect a vehicle state; an actuatable spoiler moveable into a deployed position and a stowed position; an actuator operable to move the actuatable spoiler into the deployed position and the stowed position; and a controller configured to selectively instruct the actuator to actively cycle the actuatable spoiler between the deployed position and the stowed position based on the detected vehicle state. The actuatable spoiler is retained in the deployed position for a longer length of time than in the stowed position. The vehicle also includes a human machine interface selectively actuated by an operator of the vehicle to retain the actuatable spoiler in the stowed position for a predetermined length of time.

11 Claims, 3 Drawing Sheets

ACTIVE DECK-LID SPOILER CONTROL SYSTEM FOR A MOTOR VEHICLE

INTRODUCTION

The present disclosure relates to airflow control devices for vehicles, and more particularly, to active vehicle spoilers that are selectively cycled to minimize contaminate buildup on rear windshields of motor vehicles.

A spoiler is an aerodynamic device whose intended design function is to interrupt or spoil unfavorable airflow over a vehicle body while the vehicle is motion to enhance the performance of the vehicle. Uninterrupted airflow over a vehicle body can create a low-pressure zone immediately behind the rear end of the vehicle when the vehicle is traveling at highway speeds. The low-pressure zone results in increased vehicle drag, which can adversely affect the vehicle's dynamic performance and fuel economy. This is especially true for vehicle bodies that have a gradual downward angle extending from the rear roofline down to the edge of the deck-lid of the vehicle, also known as a fastback type vehicle. For fastback type vehicles, the airflow passing over the deck-lid separates into turbulent eddies resulting in a low-pressure zone immediately behind the vehicle resulting in increased drag.

Rear deck-lid mounted spoilers are known in the art of vehicle manufacture to control airflow over the rear of a vehicle. A spoiler at the rear of the vehicle have the effect of providing downforce as well as delaying airflow separation from the vehicle. The delayed separation streamlines the airflow to reduce aerodynamic drag on the vehicle. At low speeds a fixed rear spoiler may actually increase vehicle drag and does little to improve the dynamic handling of the vehicle due to having little airflow over the spoiler. It is known to equip motor vehicles with an actuatable spoiler that is moveable between an extended deployed position and a retracted stowed position. The actuatable spoiler may be deployed in response to the vehicle reaching a predetermined speed and stowed when the vehicle is traveling below the predetermined speed.

While such active rear spoilers are generally satisfactory for their intended purpose, however there exist an on-going need to improve the operations of the active rear spoiler to fully exploit its potentials.

SUMMARY

According to several aspects, a vehicle having at least one vehicle sensor configured to detect a vehicle state; an actuatable spoiler disposed transversely on a rear portion of the vehicle, wherein the actuatable spoiler is moveable into a deployed position and a stowed position; an actuator coupled to the actuatable spoiler, wherein the actuator is operable to move the actuatable spoiler into the deployed position and the stowed position; and a controller in communication with the at least one vehicle state sensor and the actuator is disclosed. The controller is configured to selectively instruct the actuator to actively cycle the actuatable spoiler between the deployed position and the stowed position based on the detected vehicle state.

In an additional aspect of the present disclosure, the controller is configured to instruct the actuator to continuously cycle the actuatable spoiler between the deployed position and the stowed position when the at least one vehicle sensor detects a predetermined vehicle state.

In another aspect of the present disclosure, the actuatable spoiler is continuously cycled such that the actuatable spoiler is retained in the deployed position for a longer length of time than in the stowed position.

In another aspect of the present disclosure, the at least one vehicle sensor includes a speed sensor for detecting a vehicle speed, and the predetermined vehicle state is when the vehicle is moving above a predetermined vehicle speed.

In another aspect of the present disclosure, wherein the controller is configured to selectively instruct the actuator to cycle the actuatable spoiler between the deployed position and the stowed position based on the detected vehicle state includes: extending the rear spoiler into the deployed position for a first predetermined length of time when the speed of the vehicle is above a predetermined speed; then retracting the rear spoiler into a stowed position for a second predetermined length of time; and then re-extending the rear spoiler into the deployed position.

In another aspect of the present disclosure, the vehicle further includes a wiper arm. The at least one vehicle sensor includes a wiper sensor configured to detect a cycle speed of the wiper arm. The predetermined vehicle state correlates with the cycle speed of the wiper arm such that a greater the cycle speed a lesser an amount of time the actuatable spoiler is retained in the deployed position.

In another aspect of the present disclosure, the vehicle further includes a human machine interface (HMI) in communication with the controller. The HMI is configured to receive an input from an operator of the vehicle to temporally retain the actuatable spoiler in the stowed position for an extended predetermined length of time.

In another aspect of the present disclosure, the vehicle further includes a wiper setting having an on-position. The predetermined vehicle state is when the vehicle is moving above a predetermined vehicle speed and the controller is further configured to instruct the actuator to retain the actuatable spoiler in the stowed position for an extended predetermined length of time when the wiper setting is in the on-position.

In another aspect of the present disclosure, the vehicle further includes a fastback having a rear windshield gradually sloping from a roofline downward to a rear deck-lid having a trailing edge. The actuatable spoiler is disposed on the rear deck-lid adjacent the trailing edge. The predetermined length of time is sufficient to maintain visibility through the rear windshield.

In another aspect of the present disclosure, the vehicle further includes a human machine interface (HMI) configured to receive an input from an operator of the vehicle to command the controller to instruct the actuator to temporary cease the continuously cycling of the actuatable spoiler.

According to several aspects, a method of operating an actuatable rear spoiler of a vehicle is provided. The method includes determining a speed of the vehicle; extending the rear spoiler into a deployed position for a first predetermined length of time when the speed of the vehicle is above a predetermined speed; retracting the rear spoiler into a stowed position for a second predetermined length of time; and re-extending the rear spoiler into a deployed position after the second predetermined length of time.

In an additional aspect of the present disclosure, wherein the step of retracting the rear spoiler into the stowed position for the second predetermined length of time is requested by an operator of the vehicle using a Human Machine Interface (HMI).

In another aspect of the present disclosure, the method further includes continuously cycling the rear spoiler between the deployed position and stowed position when the speed of the vehicle is above the predetermined speed. The first predetermine length of time is greater than the second predetermine length of time.

In another aspect of the present disclosure, the method further includes determining a wiper cycle speed of a vehicle wiper arm; and retracting the rear spoiler into the stowed position if the wiper cycle is above a predetermined wiper speed.

In another aspect of the present disclosure, the vehicle wiper arm is located on a rear windshield of the vehicle.

According to several aspects, an active spoiler control system for a vehicle is disclosed. The system includes an actuatable spoiler transversely mountable on a rear-lid of the vehicle, wherein the actuatable spoiler is moveable between a deployed position and a stowed position; an actuator operable to move the actuatable spoiler into the deployed position and the stowed position; and a controller configured to analyze a data signal from a vehicle sensor to determine a vehicle state and to communicate with the actuator to selectively cycle the actuatable spoiler between the deployed position and stowed position based on a predetermine vehicle state.

In an additional aspect of the present disclosure, the system further includes a human machine interface selectively actuated by an operator of the vehicle to send a signal to the controller to communicate with the actuator to retain the actuatable spoiler in the stowed position for a predetermined length of time.

In another aspect of the present disclosure, the vehicle sensor includes a speed sensor for detecting a vehicle speed. The controller is configured to communicate with the actuator to continuously cycle the actuatable spoiler between the deployed position and stowed position when the controller determines the vehicle speed exceeds a predetermined speed.

In another aspect of the present disclosure, controller is configured to communicate with the actuator to cycle the actuatable spoiler such that the actuatable spoiler remains in the deployed position for a greater length of time than in the stowed position when the controller determines the vehicle exceeds a predetermined speed.

In another aspect of the present disclosure, the vehicle sensor includes a wiper cycle speed sensor. The controller is configured to communicate with the actuator to retain the actuatable spoiler in the stowed position when the wiper cycle exceeds a predetermined cycle speed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Those having ordinary skill in the art will recognize that terms such as "above," "below," "upward," "downward," "top," "bottom," etc., are used descriptively for the figures, and do not represent limitations on the scope of the disclosure, as defined by the appended claims. As used herein, the term "airflow" refers to the movement of air around and through parts of a vehicle relative to either the exterior surface of the vehicle or surfaces of elements of the vehicle along which the exterior airflow can be directed such as the exterior top surfaces of the rear portion of the vehicle including a rear mounted spoiler. The term "drag" refers to the resistance caused by friction or low pressure zones in a direction opposite that of the motion of the center of gravity for the moving vehicle in a fluid. The term "downforce" used herein refers to the component of total force due to airflow relative to the vehicle acting on the vehicle in a vertically downward direction.

Figure 1:
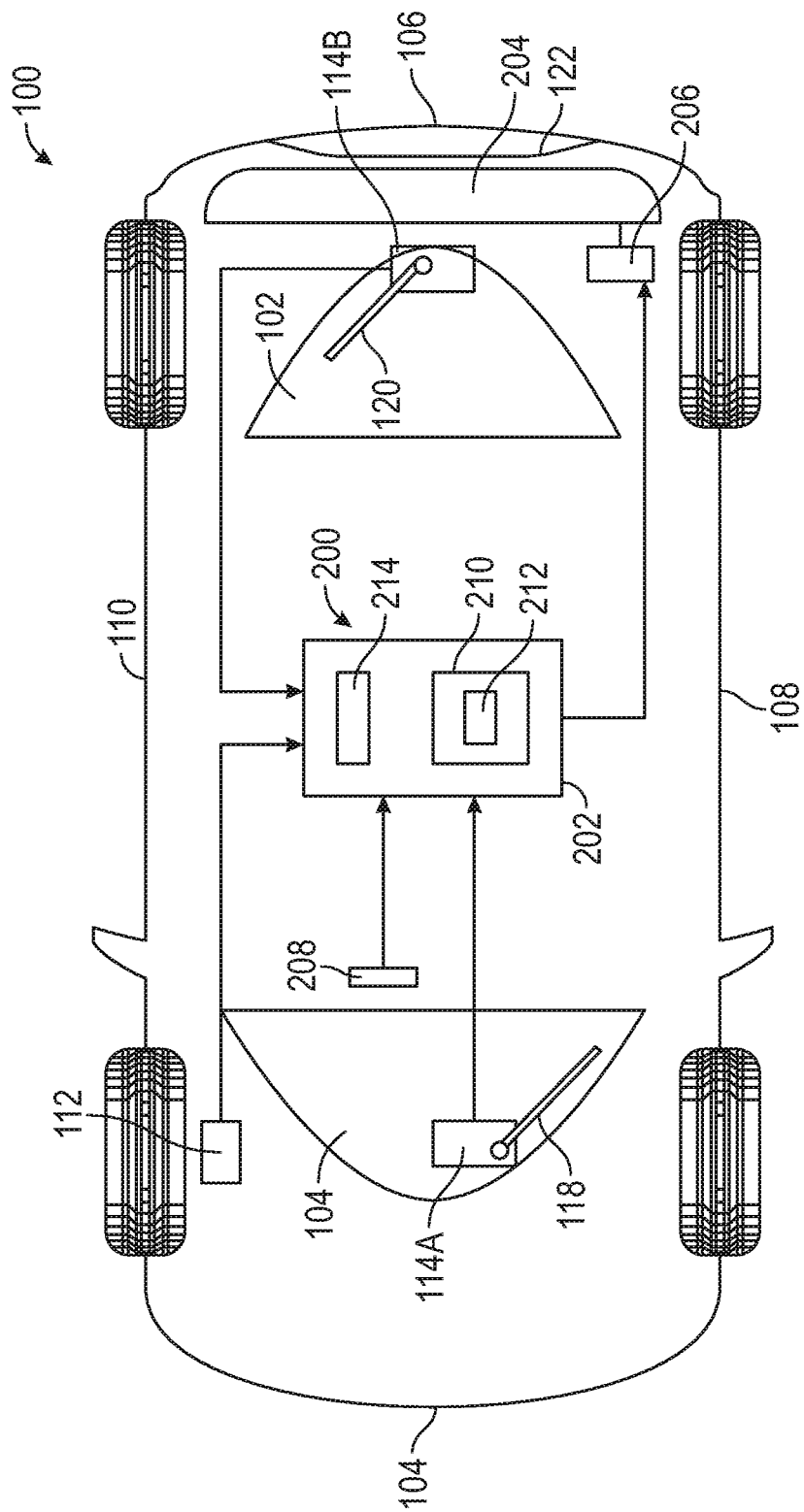
FIG. 1 is a schematic top view of a vehicle having an active spoiler control system, according to an exemplary embodiment.

FIG. 1 is a schematic top view of a motor vehicle 100 having an active spoiler control system, generally indicated with reference numeral 200. The active spoiler control system 200 includes a spoiler controller 202 configured to selectively deploy a rear actuatable spoiler 204 to minimize drag on the vehicle 100 as well as to minimize the deposits of environmental contaminants, such as dust and water, on a rear windshield 102 of the vehicle 100. For illustrative purposes, a passenger type motor vehicle is shown; however, the vehicle 100 may be that of a truck, sport utility vehicle, van, motor home, or any other type of land based vehicle. The vehicle 100 includes a front end 104, an opposing rear end 106, a left side 108 generally extending between the front end 104 and the rear end 106, and an opposing right side 110 generally extending between the front end 104 and the rear end 106. As understood by those skilled in the art, the front end 104 faces the direction of travel when the vehicle 100 is in a forward motion. Each of the left side 108 and right side 110 of the vehicle 100 coincide with a right-hand and left-hand side of an occupant positioned within the vehicle 100 when the occupant is facing the front end 104 of the vehicle 100.

The vehicle 100 includes one or more vehicle sensors 112, 114 operable to provide vehicle data to the spoiler controller 202. The vehicle sensors 112, 114 include, but are not limited to, a vehicle speed sensor 112 and at least one vehicle wiper system sensor 114A, 114B. The vehicle speed sensor 112 may be that of a wheel speed sensor 112 configured to detect the road speed of the vehicle 100 while the vehicle 100 is in motion. The wiper sensor 114 is configured to detect an operating setting of a windshield wiper system that includes at least one of a front windshield wiper arm 118 and a rear windshield wiper arm 120. The operating setting includes, but is not limited to, an off position, a first wiper cycle speed position, a second wiper cycle speed position, and a delayed wiper cycle speed position. The wiper sensor 114 may also be configured to detect the cycle speed of at least one of the wiper arms 118, 120. The cycle speed of a wiper arm may be measured in wiper cycles per minute, wherein a wiper cycle is one completed back-and-forth swipe of the wiper arm across the windshield.

Figure 2A:
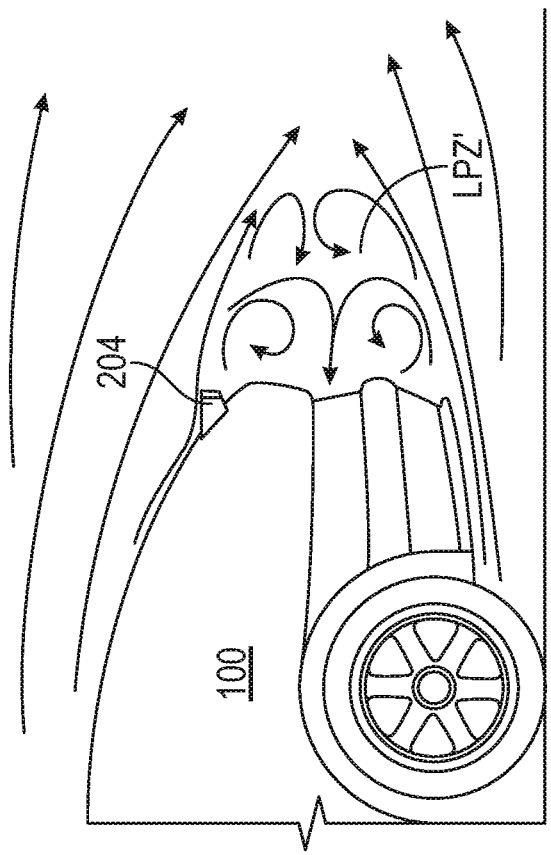
FIG. 2A is a diagrammatic rear quarter side-view of the motor vehicle of FIG. 1 showing an actuatable spoiler in a stowed position, according to an exemplary embodiment.
Figure 2B:
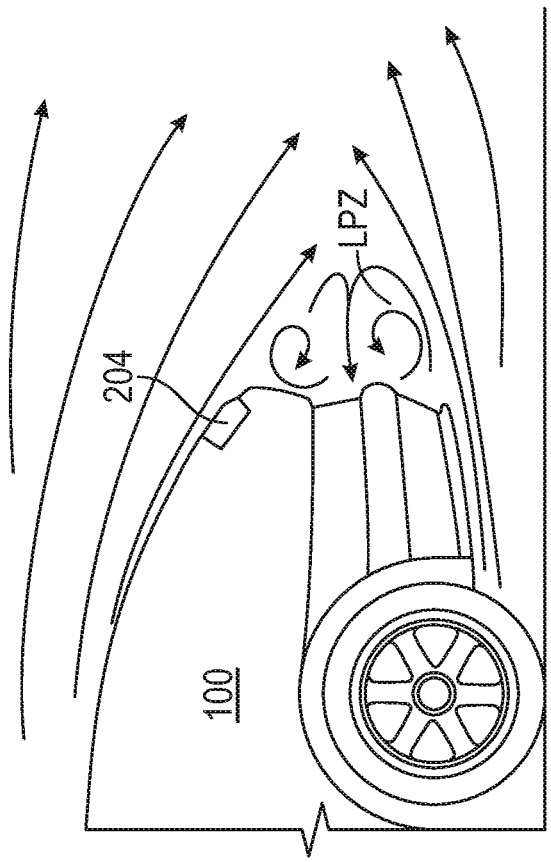
FIG. 2B is a diagrammatic rear quarter side-view of the motor vehicle of FIG. 1 with the actuatable spoiler in a deployed position, according to an exemplary embodiment.

The active spoiler control system 200 further includes an actuatable spoiler 204 transversely mounted on a rear portion of the vehicle 100, preferably proximal to a trailing edge 122 on a rear-hatch or lid of the motor vehicle 100. The actuatable spoiler 204 is operable to be retractable into a stowed position (as shown in FIG. 2A) and extendable into a deployed position (as shown in FIG. 2B). An actuator 206 is coupled to the actuatable spoiler 204 and is configured to receive a control signal from the controller 202 for selectively extending the spoiler into the deployed position and selectively retracting the spoiler into the stowed position. The actuator 206 may include, but is not limited to, one of an electric actuator, a hydraulic actuator, or a pneumatic actuator. The actuator 206 may further include all connections, linkages, drives, gearing, and other components necessary to couple the actuator 206 to the spoiler.

The active spoiler system 200 may also include a human machine interface (HMI) 208, such as physical on a dashboard or virtual buttons on a touch display screen, provided in the passenger compartment of the vehicle 100. An operator of the vehicle 100 may utilize the HMI 208 to provide a command signal to the spoiler controller 202 to retract the actuatable spoiler 204 into the stowed position, extend the actuatable spoiler 204 into the extended deployed position, or actively cycle the actuatable spoiler 204 between the stowed and deployed position.

The spoiler controller 202 includes a tangible non-transitory memory 210 having computer executable instructions recorded thereon, such as a spoiler control module 210. The spoiler controller 202 further includes a processor 214 that is operable to execute the spoiler control module 210. The spoiler controller 202 is operable to send a signal to the actuator 206 to selectively extend and retract the actuatable spoiler 204 based on vehicle state data received from the vehicle sensors 114, 116 and operator instructions from the HMI 208. The spoiler controller 202 may be embodied as one or more microprocessors, digital computers, or host machines, each having one or more processors; computer readable memory such as read only memory (ROM), random access memory (RAM), electrically-programmable read only memory (EPROM), optical drives, magnetic drives, etc.; analog-to-digital (A/D) circuitry; digital-to-analog (D/A) circuitry; and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

FIG. 2A is a diagrammatic rear quarter side-view of the motor vehicle 100 of FIG. 1 having a rear deck mounted actuatable spoiler 204 in a retracted stowed position. The motor vehicle 100 shown is a fastback type vehicle 100 where the rear windshield gradually slopes from the roofline downward to the rear deck proximal to the trailing edge 122. There are instances where it would be beneficial for the vehicle 100 to have the actuatable spoiler 204 in the retracted stowed position as shown in FIG. 2A. For example, it is desirable to have the actuatable spoiler 204 in the retracted stowed position at low speeds, such as speeds less than 35 miles per hour (MPH), to minimize low speed drag. In another example, it is desirable to have the actuatable spoiler 204 in the retracted stowed position to minimize visual obstruction while the vehicle 100 is being maneuvered into or out of a parking space.

FIG. 2B is a diagrammatic rear quarter side-view of the motor vehicle 100 having the actuatable spoiler 204 in an extended deployed position. It is desirable to have the actuatable spoiler 204 in the extended deployed position when the motor vehicle 100 is at or exceeds highway speeds, such as speeds over 45 MPH. At highway speeds, airflow over the vehicle 100 creates a low-pressure zone LPZ (see FIG. 2A) immediately behind the rear end of the vehicle 100 thus increasing vehicle drag. The actuatable spoiler 204 in the deployed position deflects and extends the airflow beyond the trailing edge 122 of the vehicle 100 thereby delaying airflow separation from the vehicle 100 thus extending the low-pressure zone LPZ' (see FIG. 2B) out further from the rear end 106 of the vehicle 100. The delayed airflow separation from the vehicle 100 reduces the turbulent eddies forming immediately behind the vehicle 100 thus reducing drag on the vehicle 100.

It was discovered that unintended consequences of delaying airflow separation from the vehicle 100 while the vehicle 100 is traveling at or above highway speeds may result in less turbulent airflow over the rear windshield 102 of the vehicle 100, thus allowing containments such as rain and dust to settle onto the rear windshield 102. To reduce the accumulation of containments, it is desirable to occasionally retract the actuatable spoiler 204 into the stowed position to allow for the uninterrupted turbulent airflow over the vehicle 100 to carry away containments from the rear windshield 102. The actuatable spoiler 204 may be manually or automatically actuated between the deployed position and stowed position to allow uninterrupted airflow over the vehicle 100 to reduce containments on the rear windshield 102. During each cycle, the actuatable spoiler 204 may be retained in the deployed position for a longer time interval than in the stowed position.

Figure 3:
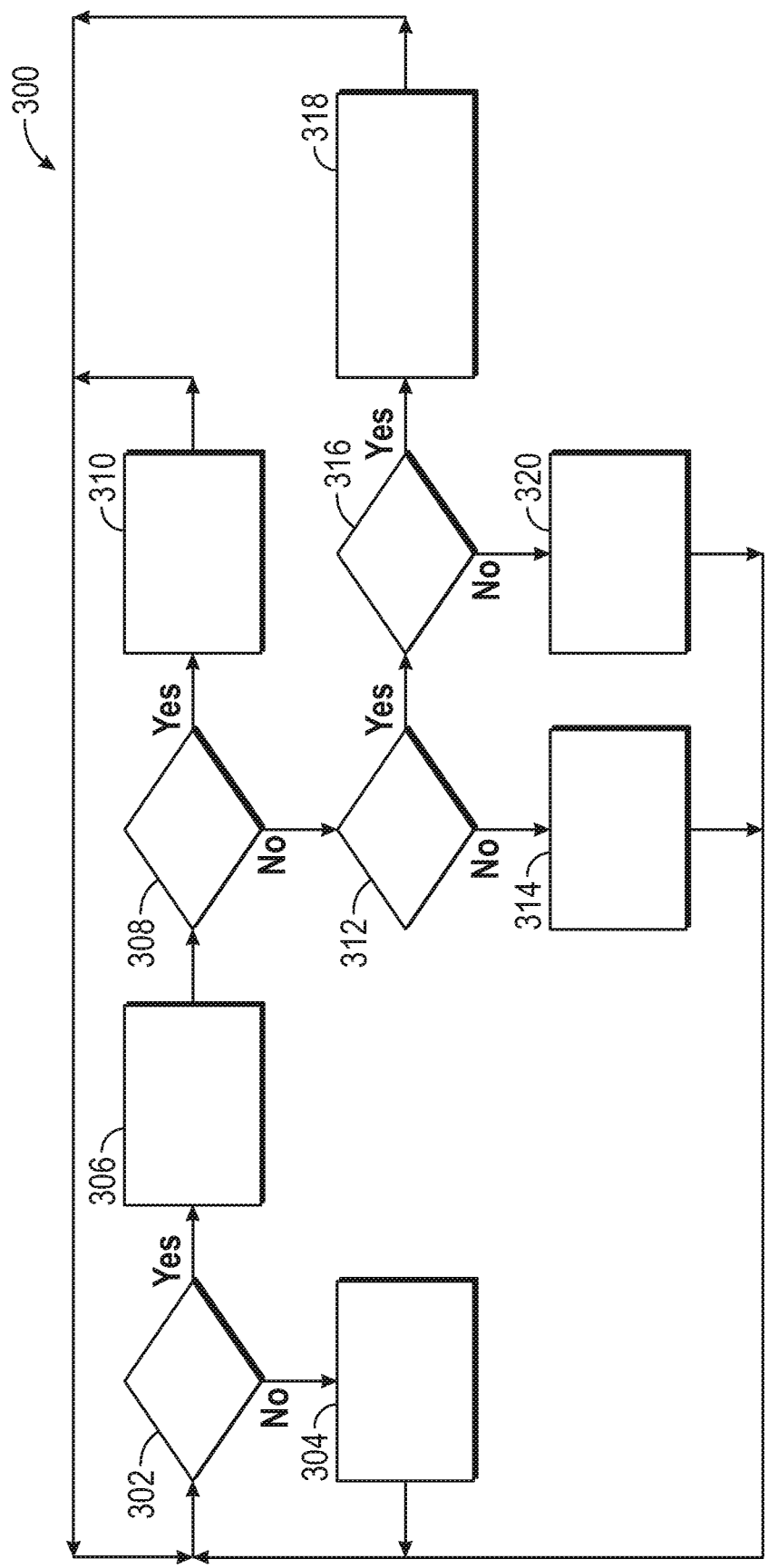
FIG. 3 is a block flow diagram of a method of operating the active spoiler control system of FIG. 1, according to an exemplary embodiment.

FIG. 3 is a block flow diagram of a method of operating the active spoiler control system 200 to continuously cycle the actuatable spoiler 204 between the deployed position and the stowed position to minimize low pressure drag on the vehicle 100, while also minimizing contaminate buildup on the rear windshield 102, when the vehicle is traveling at highway speeds. The method is generally indicated by reference numeral 300.

In Step 302, the spoiler controller 202 receives and analyzes data from the vehicle speed sensor 112. If the spoiler controller 202 determines the road speed of the vehicle 100 is less than a predetermined speed, such as less than highway speed, the method proceeds to Step 304 where the spoiler controller 202 retracts the actuatable spoiler 204 into the stowed position, if the actuatable spoiler 204 is in the deployed position, and the method returns to Step 302. If the spoiler controller 202 determines the road speed of the vehicle 100 is at or greater than the predetermined speed, then the method proceeds to Step 306 where the spoiler controller 202 extends the actuatable spoiler 204 into the deployed position, if the actuatable spoiler 204 is in the stowed position, and the method proceeds to Step 308.

In Step 308, the vehicle operator may interface with the HMI 208 to manually cycle the actuatable spoiler 204. If the spoiler controller 202 receives an input from the HMI 208 to cycle the actuatable spoiler 204, then the method proceeds to Step 310 where the spoiler controller 202 retracts the actuatable spoiler 204 into the stowed position for a predetermined length of time, such as 5 to 15 seconds, and the method returns to Step 302.

If the spoiler controller 202 does not receives an input from the HMI 208 to cycle the actuatable spoiler 204, then the method proceeds to Step 312 where the spoiler controller 202 determines if the spoiler system 200 is set in automatic mode. If the spoiler 204 is not set to automatic cycle, then the method proceeds to Step 314 where the actuatable spoiler 204 remains in the deployed position and the method returns to Step 302.

If the actuatable spoiler 204 is set to automatic mode, the spoiler controller 202 cycles the actuatable spoiler 204 between the deployed position and the stowed position at a predetermined cycle frequency where the actuatable spoiler 204 remains in the deployed position for a first predetermined length of time and then the actuatable spoiler 204 is retracted into the stowed position for second predetermined length of time. It is preferable that the first predetermined length of time is greater than the second predetermined length of time. The method proceeds to Step 316 where the spoiler controller 202 determines whether at least one of the front and rear windshield wiper arms 118, 120 is activated.

If at least one of the wiper arms 118, 120, preferably the rear wiper arm 120, is activated in the on-position, the method proceeds to Step 318 where the spoiler controller 202 retracts the actuatable spoiler 204 into the stowed position based on a predetermined wiper cycle speed for a predetermined amount of time and the method returns to Step 302. If at least one of the wiper arms 118, 120 is not activated, then the method proceeds to Step 320 where the actuatable spoiler 204 remains in the deployed position and the method returns to Step 302.

The description of the present disclosure is merely exemplary in nature and variations that do not depart from the gist of the present disclosure are intended to be within the scope of the present disclosure. Such variations are not to be regarded as a departure from the spirit and scope of the present disclosure.

We claim:

1. A vehicle comprising:
at least one vehicle sensor configured to detect a vehicle state;
an actuatable spoiler disposed transversely on a rear portion of the vehicle, wherein the actuatable spoiler is moveable into a deployed position and a stowed position;
an actuator coupled to the actuatable spoiler, wherein the actuator is operable to move the actuatable spoiler into the deployed position and the stowed position; and
a controller in communication with the at least one vehicle sensor and the actuator;
wherein the at least one vehicle sensor comprises a speed sensor for detecting a vehicle speed and the vehicle state includes a predetermined vehicle speed, and
wherein the controller is configured to instruct the actuator to initial a continuous cycling of the actuatable spoiler between the deployed position and the stowed position when the speed sensor detects the vehicle is moving above the predetermined vehicle speed, wherein the continuous cycling of the actuatable spoiler includes:
extending the actuatable spoiler into the deployed position for a first predetermined length of time, and
then retracting the actuatable spoiler into a stowed position for a second predetermined length of time;
wherein the first predetermined length of time is greater than the second predetermined length of time.

2. The vehicle of claim 1, further comprising a wiper arm; wherein:
the at least one vehicle sensor further comprises a wiper sensor configured to detect a cycle speed of the wiper arm and the vehicle state includes a predetermined cycle speed of the wiper arm, and
the controller is further configured to instruct the actuator to decrease the first predetermined length of time the actuatable spoiler is in the deployed position when the cycle speed of the wiper arm exceeds the predetermined cycle speed of the wiper arm.

3. The vehicle of claim 1, further comprising a human machine interface (HMI) in communication with the controller, wherein the HMI is configured to receive an input from an operator of the vehicle to temporally retain the actuatable spoiler in the stowed position for an extended predetermined length of time.

4. The vehicle of claim 2, further comprising a fastback having a rear windshield gradually sloping from a roofline downward to a rear deck-lid having a trailing edge;
wherein the actuatable spoiler is disposed on the rear deck-lid adjacent the trailing edge, and
wherein the second predetermined length of time is sufficient to maintain visibility through the rear windshield.

5. A method of operating an actuatable rear spoiler of a vehicle, comprising:
determining a speed of the vehicle;
extending the rear spoiler into a deployed position for a first predetermined length of time when the speed of the vehicle is above a predetermined speed;
retracting the rear spoiler into a stowed position for a second predetermined length of time; and
continuously cycling the rear spoiler between the deployed position and the stowed position when the speed of the vehicle is above the predetermined speed;
wherein the first predetermine length of time is greater than the second predetermine length of time.

6. The method of claim 5, wherein the retracting the rear spoiler into the stowed position for the second predetermined length of time is requested by an operator of the vehicle using a Human Machine Interface (HMI).

7. The method claim 5, further comprising:
determining a wiper cycle speed of a vehicle wiper arm; and
retracting the rear spoiler into the stowed position if the wiper cycle is above a predetermined wiper speed.

8. The method of claim 7, wherein the vehicle wiper arm is located on a rear windshield of the vehicle.

9. An active spoiler control system for a vehicle comprising:
an actuatable spoiler transversely mountable on a rear-lid of the vehicle, wherein the actuatable spoiler is moveable between a deployed position and a stowed position;
an actuator operable to move the actuatable spoiler into the deployed position and the stowed position; and a controller configured to analyze a data signal from a vehicle sensor to determine a vehicle state and to communicate with the actuator to continuously cycle the actuatable spoiler between the deployed position and stowed position based on a predetermined vehicle state;

wherein:

the vehicle sensor comprises a speed sensor for detecting a vehicle speed, the controller is configured to communicate with the actuator to continuously cycle the actuatable spoiler between the deployed position and stowed position when the speed sensor detect the vehicle speed exceeds a predetermined speed, such that the actuatable spoiler remains in the deployed position for a greater length of time than in the stowed position.

10. The active spoiler control system of claim 9, further comprising:

a human machine interface selectively actuated by an operator of the vehicle to send a signal to the controller to communicate with the actuator to retain the actuatable spoiler in the stowed position for a predetermined length of time.

11. The active spoiler control system of claim 9, wherein:

the vehicle sensor comprises a wiper cycle speed sensor a wiper cycle speed, and the controller is configured to communicate with the actuator to retain the actuatable spoiler in the stowed position when the wiper cycle speed exceeds a predetermined cycle speed.

* * * * *